United States Patent [19]

Grover

[11] Patent Number: 4,680,583
[45] Date of Patent: Jul. 14, 1987

[54] TERMINAL ADDRESS ASSIGNMENT IN A BROADCAST TRANSMISSION SYSTEM

[75] Inventor: Wayne D. Grover, Ottawa, Canada

[73] Assignee: Northern Telecom Limited, Montreal, Canada

[21] Appl. No.: 697,543

[22] Filed: Feb. 1, 1985

[51] Int. Cl.$^4$ .................. H04Q 3/00; G05B 23/02; H04V 3/24

[52] U.S. Cl. .................. 340/825.52; 340/825.08; 340/825.5; 370/93; 370/96; 455/33

[58] Field of Search .................. 340/825.52, 825.08, 340/825.07, 825.5, 311.1; 371/22, 24; 455/33; 370/93, 89, 96

[56] References Cited

U.S. PATENT DOCUMENTS 3,755,782 8/1973 Haas et al. .................. 340/825.08
3,787,627 1/1974 Abramson et al. .................. 370/89

FOREIGN PATENT DOCUMENTS

0030254 2/1983 Japan .................. 340/825.07
0193650 11/1984 Japan .................. 340/825.52

Primary Examiner—Ulysses Weldon
Assistant Examiner—Ralph Smith
Attorney, Agent, or Firm—R. John Haley

[57] ABSTRACT

In a broadcast transmission system, in which in normal operation messages and terminal addresses are transmitted between a master station and a plurality of terminals each having an assigned address, the master station initially assigns the addresses to the terminals. In order to isolate each terminal in turn to assign it an address, the master station varies one or more parameters which affect the bit error rate of the terminals while polling the terminals, and each terminal which receives the poll with an acceptable bit error rate responds to the poll. When the master station receives only one response to a poll, it assigns an address to the responding, isolated, terminal which thereafter does not respond to the poll. This procedure is repeated until addresses have been assigned to all of the terminals. The parameter may, in particular, be the strength of the signal transmitted by the master station.

11 Claims, 6 Drawing Figures

TERMINAL ADDRESS ASSIGNMENT IN A BROADCAST TRANSMISSION SYSTEM

This invention relates to terminal address assignment in a broadcast transmission system.

In a broadcast transmission system, in which a master station or zone controller broadcasts messages with terminal addresses and each slave station or terminal within the broadcast zone accepts only those messages which are accompanied by an address of the terminal, each terminal must be assigned a unique address. In the prior art this address assignment has been effected by programming during manufacture or by manually setting switches in each terminal on set-up of the system with subsequent recording of the particular addresses which have been assigned. This results in relatively inflexible address assignments, making it awkward to modify the system for example by adding new terminals or moving terminals from one location to another either within one zone or between different zones. It also involves the costs of providing, for example address switches in the terminals and setting and recording the settings of such switches.

It is observed that the above comments apply in principle regardless of the particular nature and size of the transmission system. For example, the broadcast zones may be individual rooms of a building where the transmission is effected by broadcasting optical, e.g. infrared, signals, or they may be different areas of a building or region in which different zones are defined by different carrier frequencies of an r.f. carrier signal used for the broadcasting, or they may be different areas defined by a cable via which the broadcast signals are distributed either at base-band or on a carrier signal. The system may even be a satellite communication system in which a shared carrier is used for communication between a satellite constituting the zone controller or master station and earth stations constituting the terminals or slave stations. In addition, the terminals may be of any type; in particular, they may be constituted by data terminals and or telephones.

An object of this invention is to provide an improved method of assigning addresses to terminals in a broadcast transmission system.

According to one aspect of this invention there is provided a method of assigning addresses to a plurality of terminals in a broadcast transmission system in which in normal operation messages and said addresses are transmitted between a master station and said terminals, the method comprising the steps of:

(a) transmitting from the master station a general polling message to which any terminal may respond;

(b) transmitting a response from each terminal which receives the general polling message and which does not have an assigned address;

(c) varying at the master station at least one parameter which affects the bit error rate of the terminals;

(d) repeating steps (a) to (c) until the master station receives only one response, whereby one terminal is isolated;

(e) transmitting an assigned address from the master station to the isolated terminal; and (f) repeating steps (a) to (e) until each of the terminals has an assigned address.

Thus in accordance with this invention addresses for all of the terminals are assigned by the master station itself, so that manual setting of address switches and inflexible address assignments are avoided. In the invention, the sensitivity. of the bit error rate of each terminal to signal conditions, and the variation of this sensitiviy between terminals, is exploited in order to isolate the terminals one by one so that they can be assigned respective addresses for use in subsequent normal operation.

Steps (c) and (d) of the above method preferably comprise the steps of:

(g) initially controlling said at least one parameter to produce a high bit error rate in each of the terminals, whereby none of the terminals transmits a response to the general polling message;

(h) changing the parameter to reduce the bit error rate in each of the terminals until at least one terminal transmits a response to the general polling message;

(i) detecting in the master station a collision between responses to the general polling message from more than one terminal; and (j) in response to detection of a collision, changing the parameter to increase the bit error rate in each of the terminals.

In order to achieve a progressive hunting effect in isolating the terminals, preferably the parameter is changed by a smaller amount in step (j) than in the preceding step (h); the amount by which the parameter is changed in step (h) is then preferably increased following the assignment of an address to an isolated terminal in step (e).

The at least one parameter conveniently comprises the strength of the signal transmitted from the master station. This parameter may be varied either alone or in combination with one or more other parameters.

According to another aspect the invention provides a method of assigning addresses to a plurality of terminals in a broadcast transmission system in which in normal operation messages and said addresses are transmitted between a master station and said terminals, the method comprising the steps of:

(a) reducing to a low level the strength of the signal transmitted by the master station, whereby each terminal is subjected to a high bit error rate;

(b) transmitting from the master station a general polling message to which any terminal may respond;

(c) transmitting a response from each terminal which receives the general polling message with a tolerable bit error rate and which has not yet been assigned an address;

(d) detecting in the master station whether there is no response, a single response, or multiple responses to the general polling message and in dependence upon such detection proceeding with step (e), (g), or (f) respectively;

(e) increasing by an amount D the strength of the signal transmitted by the master station and returning to step (b);

(f) decreasing the magnitude of the amount D, reducing by the new amount D the strength of the signal transmitted by the master station, and returning to step (b);

(g) transmitting an assigned address from the master station;

(h) transmitting from each terminal which receives an assigned address an acknowledgement of the assignment;

(i) detecting in the master station each acknowledgement of the assigned address, and in the absence of such detection returning to step (f); and (j) increasing the magnitude of the amount D and returning to step (e) until a normal operating strength of the signal transmitted by the master station is reached.

The invention also extends to a master station for use in a broadcast transmission system in which in normal operation messages and terminal addresses are transmitted between the master station and a plurality of terminals each with an assigned address, the master station including means for assigning said addresses to said terminals, said means comprising: means for transmitting a general polling message to which any terminal may respond; means for detecting whether no response, a single response, or multiple responses are received from the terminals in response to the general polling message, and for varying in dependence upon such detection at least one parameter which affects the bit error rate of the terminals, whereby in response to a general polling message a single response from one terminal is received; means for transmitting an assigned address to said one terminal; and means for repeating the general polling message until each of the terminals has been assigned an address.

The invention further extends to a terminal for use in a broadcast transmission system in which in normal operation messages and terminal addresses are transmitted between a master station and a plurality of such terminals each with an assigned address, the terminal comprising: means responsive to a high bit error rate of its received signal for assuming a first state in which the terminal does not transmit; means responsive to a reduced bit error rate of its received signal for assuming a second state in which the terminal transmits a response to a general polling message from the master station; and means responsive to an address received from the master station while in the second state for adopting said address as its assigned address and assuming a third, normal state in which the terminal does not respond to said general polling message.

The invention will be further understood from the following description with reference to the accompanying drawings, in which.

Figure 1:
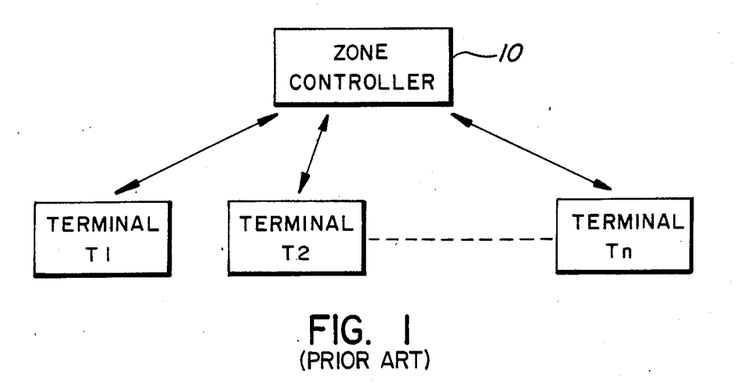
FIG. 1 illustrates the known general form of a broadcast transmission system to which the invention may be applied.

FIG. 1 illustrates the general form of a broadcast transmission system, comprising a zone controller 10 and an arbitrary number of terminals T1, T2, ... Tn each of which exchanges messages with the zone controller 10 as indicated in FIG. 1 by double-headed arrows. The zone controller 10 may alternatively be referred to as a master station or central station, and the terminals may alternatively be referred to as slave stations or distributed stations.

In order to communicate individually with the terminals, the zone controller 10 broadcasts each message for a terminal to all of the terminals, together with the assigned address of the terminal for which the message is intended. Each terminal responds to its own address, so that it receives only those messages which are intended for it. For communication in the opposite direction of transmission, each terminal transmits messages each with the terminal's address, so that the zone controller 10 receives not only the message but also the identity of the terminal emitting the message. In systems allowing contention, the zone controller 10 resolves conflicts (collisions) between overlapping transmissions from different terminals in known manner which need not be described here. In non-contention systems collisions are avoided in normal operation by permitting terminals to send only in response to a query message on their address.

The invention applies in either case and is concerned with the assignment of addresses to the terminals. As alreay discussed, in the prior art these addresses are generally assigned manually in some manner, for example by setting switches in each terminal on set-up of the system. The invention departs radically from this by having the zone controller 10 assign addresses to the terminals. This involves overcoming the circular problem that each terminal must be individually addressed by the zone controller in order to assign it an address by which it can be individually addressed. The manner in which this problem is overcome is described in detail below.

Figure 2:
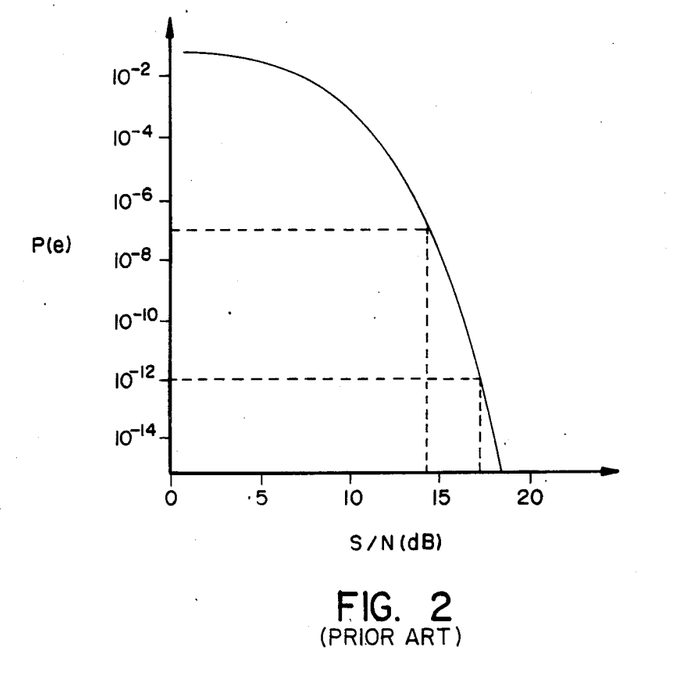
FIG. 2 is a graph illustrating the known relationship between signal-to-noise ratio and error probability in a transmission system.

FIG. 2 illustrates the known relationship between error probability P(e) and signal-to-noise ratio SN for a binary signal transmission system. As is known (the logarithmic axes in FIG. 2 disguise it), this curve is extremely steep, and the corresponding curve for multi-level rather than binary coding schemes, and for transmission systems using forward error correction techniques, is even steeper. To illustrate the steepness of the curve, it can be seen from FIG. 2 that the error probability in a symmetric binary baseband channel changes from $10^{-12}$ to $10^{-7}$, a factor of $10^5$ (i.e. 10 million percent), for a change in signal-to-noise ratio from 16.9 to 14.3 dB, a signal strength change of 2.6 dB or 35%.

In this embodiment of the invention, this drastic change in error probability for relatively small changes in signal strength is exploited in order for the zone controller to discriminate between the terminals in an individual manner. To this end, in order initially to assign addresses individually to the terminals to allow normal operation in known manner in this embodiment of the invention the zone controller modifies (generally increases from a low level) the signal strength of its transmitted signal until the errors in the received signals of the individual terminals are such that only one terminal receives and acknowledges a general poll of all the terminals, whereupon the zone controller assigns that terminal a unique address. That terminal subsequently responds only to messages accompanied by this address, so that it takes no further part in the address assignment process. These steps are repeated for all of the terminals in turn, until addresses have been assigned to all of the terminals and normal operation proceeds at full signal strength.

Figure 3:
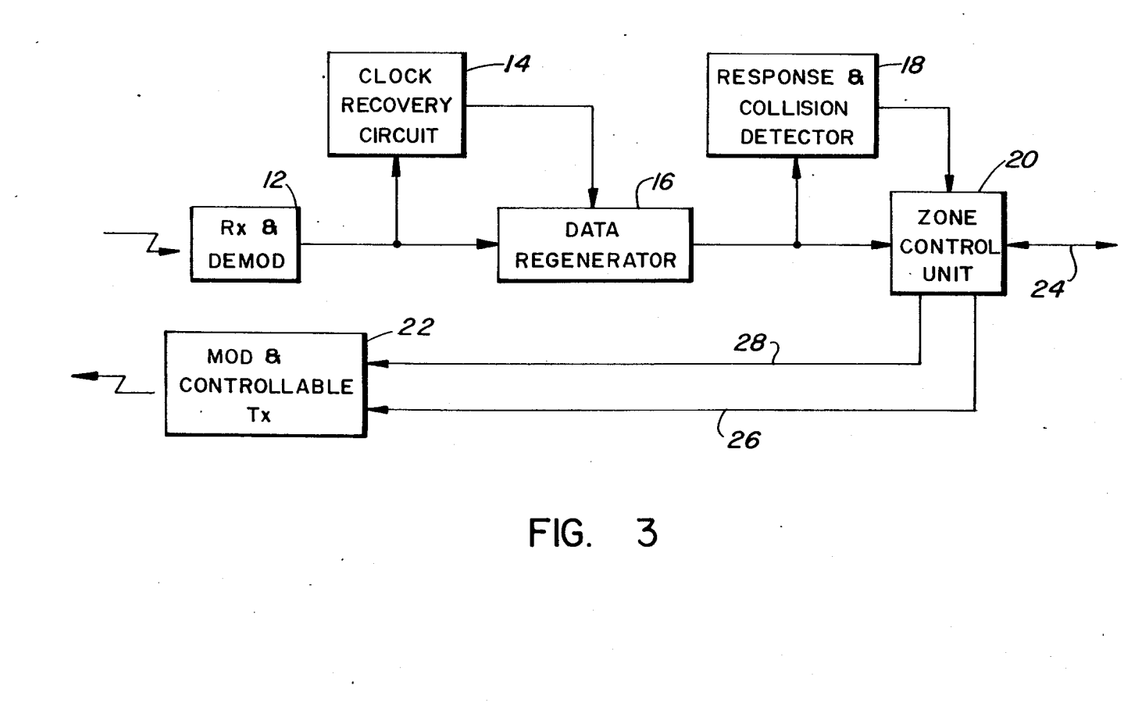
FIGS. 3 and 4 are block diagrams illustrating parts of respectively a zone controller and a terminal in a broadcast transmission system in which addresses are assigned in accordance with an embodiment of the invention.

FIG. 3 illustrates a block diagram of part of the zone controller, which comprises a signal receiver and demodulator 12, a clock recovery circuit 14, a data regenerator 16, a response and collision detector 18, a zone control unit 20, and a modulator and controllable signal transmitter 22. Except for the operation of the zone control unit 20 as described below with reference to the flow chart in FIG. 5, and the controllable nature of the signal transmitter 22, these units can be of conventional form.

Digital signals transmitted from the terminals to the zone controller are received and demodulated by the unit 12, a clock signal is recovered from them by the circuit 14, and the signals are regenerated by the regenerator 16 for processing by the control unit 20. Errors and collisions are detected by the detector 18, and correctly received data is forwarded from the zone control unit 20 via a transmission link 24. The link 24 may lead directly to transmission lines, to a host computer, or to a switch for connections to other zone controllers.

Data in the opposite direction of transmission is passed from the link 24 via the zone control unit 20, which adds to the data the address of the terminal for which the data is intended, and via a line 26 to the modulator and transmitter 22, to be broadcast to all of the terminals. Such broadcast transmission in normal operation is effected at full signal strength. In addition, the signal strength of the transmitter can be controlled by the zone control unit 20 via a line 28. This control is effected in the manner described below in order to assign addresses to the terminals.

Figure 4:
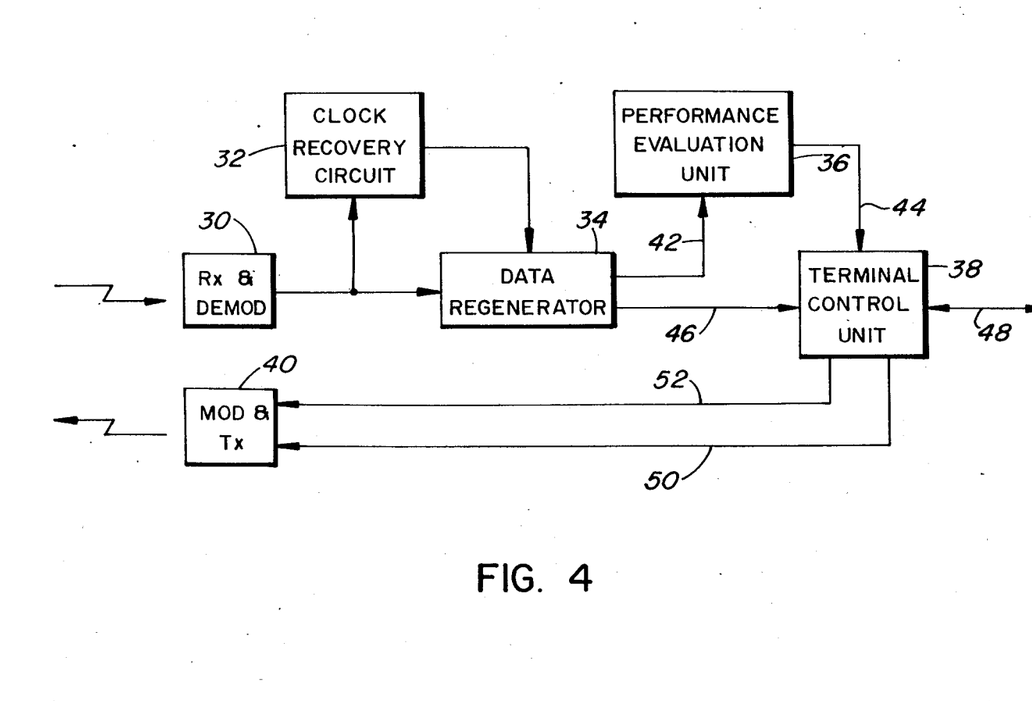

FIG. 4 shows a block diagram of part of a terminal, which comprises a signal receiver and demodulator 30, a clock recovery circuit 32, a data regenerator 34, a performance evaluation unit 36, a terminal control unit 38, and a modulator and transmitter 40. Each of these units is of conventional form, and their arrangement is generally similar to the units of the zone controller described above. Thus in each terminal signals are received and demodulated by the unit 30, a clock signal is recovered by the circuit 32 and data is regenerated by the regenerator 34. The performance evaluation unit 36 is supplied with a bit error rate (BER) signal from the regenerator 34 via a line 42, and in dependence upon the error rate supplies a pass/fail signal to the unit 38 via a line 44.

If the pass/fail signal on the line 44 indicates an acceptable error rate, the terminal control unit 38 processes data supplied via a line 46 from the regenerator 34 in a generally conventional manner, identifying messages intended for the terminal by recognizing its own assigned address and forwarding such messages to the remainder of the terminal via a transmission path 48. Messages to be transmitted in this case are supplied via the path 48, and the terminal control unit 38, which adds the assigned address to messages for transmission, to a line 50 and thence to the modulator and transmitter 40 for transmission.

If the pass/fail signal on the line 44 indicates an excessive error rate, the terminal control unit is inhibited from processing the received and regenerated data, and supplies a control signal via a line 52 to the modulator and transmitter 40 to prevent signal transmission.

Figure 5:
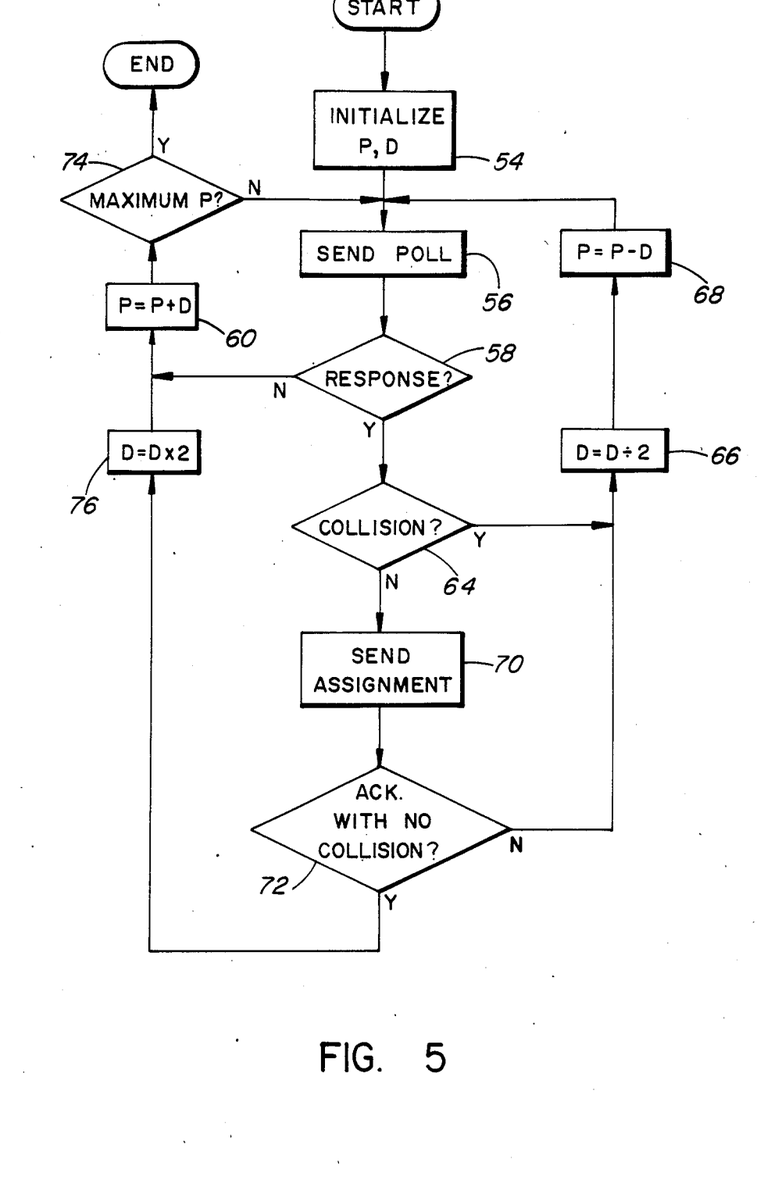
FIG. 5 is a flow chart illustrating operations of the zone controller in assigning addresses to terminals during a zone initialization process in this embodiment of the invention.
Figure 6:
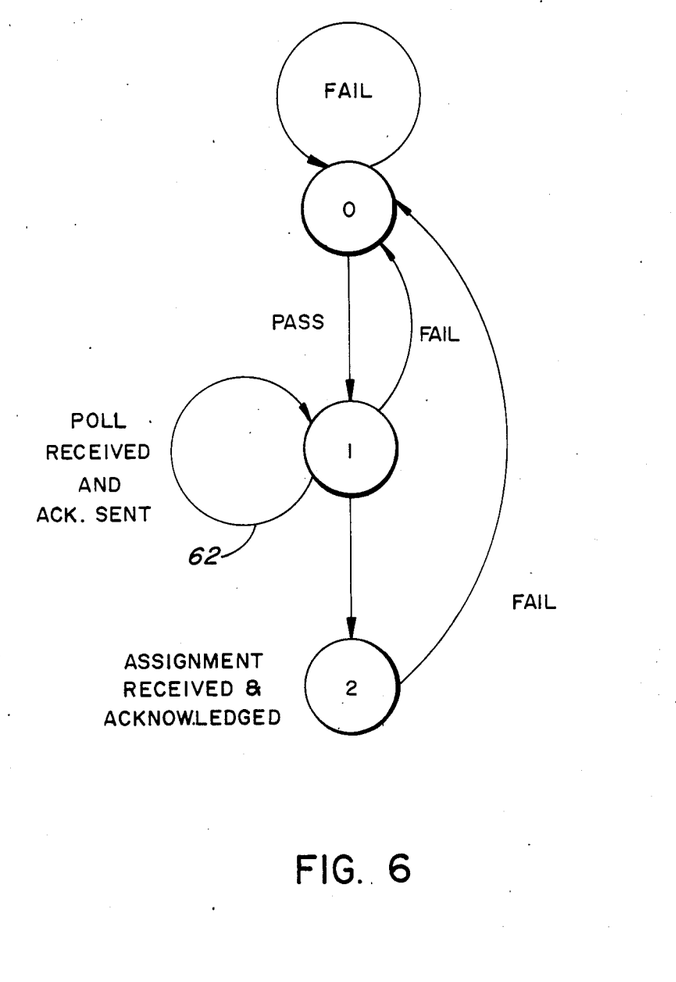
FIG. 6 illustrates a state diagram of a terminal.

FIG. 5 shows a flow chart illustrating the operation of the zone controller in assigning addresses to terminals. Such an assignment is effected on set-up of a group of terminals in a given zone, and may be repeated arbitrarily, for example on a daily basis every morning at the start of work, or when the configuration of the terminals is changed, e.g. when a terminal is added to or removed from the group. The address assignment is also explained with reference to FIG. 6 which shows a state diagram for a terminal. As shown in FIG. 6, each terminal can have any one of three states referenced 0, 1, and 2 corresponding respectively to an excessive BER, an acceptable BER, and a normal operating state.

At the start of the address assignment process, as shown in block 54 in FIG. 5 the zone controller 10 initializes its signal strength or transmitted power P, and a step size D for changing this power, to predetermined values. In particular, the power P may be set to zero or a very small value, the transmitter 22 being controlled by the zone control unit 20 via the line 28 accordingly. In response to the low transmitted power level all of the terminals have a high BER, the pass/fail signal on the line 44 of each terminal representing a fail condition and causing the terminal to adopt state 0, as shown in FIG. 6, regardless of its previous state.

In a block 56 in FIG. 5, the zone controller 10 transmits at the prevailing power level P a general poll of all of the terminals. If there is no response as determined at decision block 58, the power level P is increased by the prevailing step size D at block 60. In a block 74, the zone control unit 20 determines whether the maximum transmitted power level P has been reached, in which case it is determined that addresses have been assigned to all of the terminals and that normal operation can proceed. Otherwise the general poll at block 56 is repeated.

This general polling of all of the terminals, i.e. a polling without restriction by assigned addresses, is repeated until the transmitted power level P is sufficient that one or more of the terminals responds. Referring to FIG. 6, each terminal in state 0 adopts state 1 when the pass/fail signal on the line 44 indicates an acceptable BER or pass condition. In state 1, in which the transmitter of the terminal is turned on y the terminal control unit 38 via the line 52, in response to a general poll the terminal transmits an acknowledgement in response, as shown by a line 62 in FIG. 6. It is this response which is determined in block 58 in FIG. 5.

At a block 64 in FIG. 5 the zone control unit 20 determines from the response and collision detector 18 whether there is only one terminal which has responded, or whether a collision has occurred between responses from two or more terminals. In response to a collision, in a block 66 the zone control unit 20 halves the step size D, and in a block 68 it decreases the transmitted power level P by the new step size D. It then sends another general poll at block 56, in response to which there may be no response, a single response, or multiple responses causing a collision. The steps described above are repeated, with a consequent hunting of the transmitted power level P, until in the decision blocks 58 and 64 it is determined that there is a response and no collision, and hence that one and only one terminal is responding.

In this situation, the zone controller 10 sends at block 70 an address assignment for this one terminal, and checks at decision block 72 that this is acknowledged without any collision. In the event of no acknowledgement or a collision occurring, the above hunting process is resumed at block 66. As shown in FIG. 6, the one terminal which is isolated by the hunting process adopts state 2, its normal operating state, in response to the received address assignment, which it acknowledges. Thereafter, the terminal does not respond to any general polls, but only responds to messages with its assigned address. Thus the terminal, having received its address assignment, takes no further part in the initialization process.

Following each correctly acknowledged address assignment, the zone control unit 20 doubles the step size D at a block 76 and resumes the above described hunting process at block 60, ultimately reaching the maximum transmitted power level P as determined in the block 74 whereupon the address assignment process ends.

In the above described manner, the zone controller 10 progressively increases its transmitted power level from a low level to its maximum or normal operating level, hunting to isolate responses from individual terminals so that addresses can be assigned individually to all of the terminals. Typically, the best-positioned terminal, e.g. that closest to the zone controller 10, will be assigned its address first, with the other terminals being assigned addresses in an order determined by their positions relative to the zone controller. The arbitrary order in which the addresses are assigned is also influenced by factors such as sensitivity of the terminals, their orientation, directional variations of the signal transmitted by the zone controller, and reflections or standing wave patterns which may be set up. Generally, no two terminals will have precisely the same BER for the same transmitted power level p bearing in mind the steepness of the curve in FIG. 2, and the infinite number of small variations in background circuit noise and other impairments inherent in the manufacture of the receiver circuitry. In consequence, each terminal among a typical number (e.g. up to 64) of terminals in a zone can be quickly individually isolated and an address assigned, and the entire address assignment process can be effected very rapidly. In proportion with the maximum number of terminals to be accommodated, the pass/fail bit error rate criteria may be decreased to a point where the slope of FIG. 2 is even greater. By this means the probability of failure to isolate two terminals can be controlled and, in general, initialization speed and probability of failure can be traded one against the other.

In the unlikely event that two terminals can not be isolated from one another in the above described manner, several options are available. The flow chart of FIG. 5 can be modified to provide a check on the magnitude of the step size D, or the number of times that the power level P is decreased in the block 68, to determine whether such an option should be adopted.

Firstly, the zone controller 10 can instruct the two terminals not to respond to further general polls, and can provide an indication of its failure to isolate all of the terminals at the end of the address assignment process. One of the terminals can then be moved slightly and the assignment process repeated. However, even movement of a person within the zone may be sufficient for the address assignment process to succeed on a second attempt.

Alternatively the controller may instruct all terminals to reduce their pass/fail BER criteria and repeat the procedures with the resulting enhanced discrimination.

Secondly, another parameter which affects the BER can be changed in the zone controller 10. For example, the zone control unit 20 could modulate or change the clock frequency of the data supplied to the modulator and transmitter 22, whereby the two terminals can be distinguished as a result of consequent differences between their BERs. In addition part of the strategy against resolution failure can involve the manufacturing process. While all receiver units must meet some minimum sensitivity specification, it is possible to enhance the resolution discrimination by deliberately relaxing component value tolerance specifications to produce a wider random spread of unit to unit receiver sensitivity values.

Although in the particular embodiment of the invention described above the transmitted signal strength or power level, and possibly also the data clock frequency, is varied in order to isolate the individual terminals for address assignment purposes, the invention is not limited thereto. In general, the invention is applicable to the control of any one or more parameters which affect the BER of the terminals and thereby enable them to be isolated from one another with a useful probability of success (e.g. for 64 terminals in a zone to be isolated from one another successfully for address assignment 99 times out of 100 tries). Examples of parameters which may be controlled in a similar manner, other than the transmitted signal strength or power level and the data clock frequency alreay described, are: the transmitted carrier frequency; the transmitted carrier modulation depth; the data bit waveform; the directional characteristics of the transmitted signal; and noise levels of the transmitted signal (noise may be deliberately added in controlled amounts). This list is not intended to be exhaustive, and other suitable parameters which may be varied to achieve the address assignment may occur to those of ordinary skill in the art. These and numerous other modifications, variations, and adaptations, including variations in the power increase and decrease factors while hunting, may be made to the described embodiment without departing from the scope of the invention as defined in the claims.

What is claimed is:

1. A method of assigning addresses to a plurality of terminals in a broadcast transmission system in which in normal operation messages and said addresses are transmitted between a master station and said terminals, the method comprising the steps of:
    (a) transmitting from the master station a general polling message to which any terminal may respond;
    (b) trasmitting a response from each terminal which receives the general polling message and which does not have an assigned address;
    (c) varying at the master station at least one parameter which affects the bit error rate of the terminals;
    (d) repeating steps (a) to (c) until the master station receives only one response, whereby one terminal is isolated;
    (e) transmitting an assigned address from the master station to the isolated terminal; and
    (f) repeating steps (a) to (e) until each of the terminals has an assigned address.

2. A method as claimed in claim 1 wherein steps (c) and (d) comprise the steps of:
    (g) initially controlling said at least one parameter to produce a high bit error rate in each of the terminals, whereby none of the terminals transmits a response to the general polling message;
    (h) changing the parameter to reduce the bit error rate in each of the terminals until at least one terminal transmits a response to the general polling message;
    (i) detecting in the master station a collision between responses to the general polling message from more than one terminal; and (j) in response to detection of a collision, changing the parameter to increase the bit error rate in each of the terminals.

3. A method as claimed in claim 2 wherein the parameter is changed by a smaller amount in step (j) than in the preceding step (h).

4. A method as claimed in claim 3 and comprising increasing the amount by which the parameter is changed in step (h) following the assignment of an address to an isolated terminal in step (e).

5. A method as claimed in claim 1 wherein said at least one parameter comprises the strength of the signal transmitted from the master station.

6. A method as claimed in claim 4 wherein said at least one parameter comprises the strength of the signal transmitted from the master station.

7. A method of assigning addresses to a plurality of terminals in a broadcast transmission system in which in normal operation messages and said addresses are transmitted between a master station and said terminals, the method comprising the steps of:
(a) reducing to low level the strength of the signal transmitted by the master station, whereby each terminal is subjected to a high bit error rate;
(b) transmitting from the master station a general polling message to which any terminal may respond;
(c) transmitting a response from each terminal which receives the general polling message with a tolerable bit error rate and which has not yet been assigned an address;
(d) detecting in the master station whether there is no response, a single response, or multiple responses to the general polling message and in dependence upon such detection proceeding with step (e), (g), or (f) respectively;
(e) increasing by an amount D the strength of the signal transmitted by the master station and returning to step (b);
(f) decreasing the magnitude of the amount D, reducing by the new amount D the strength of the signal transmitted by the master station, and returning to step (b);
(g) transmitting an assigned address from the master station;
(h) transmitting from each terminal which receives an assigned address an acknowledgement of the assignment;
(i) detecting in the master station each acknowledgement of the assigned address, and in the absence of such detection returning to step (f); and
(j) increasing the magnitude of the amount D and returning to step (e) until a normal operating strength of the signal transmitted by the master station is reached.

8. A master station for use in a broadcast transmission system in which in normal operation messages and terminal addresses are transmitted between the master station and a plurality of terminals each with an assigned address, the master station including means for assigning said addresses to said terminals, said means comprising:
means for transmitting a general polling message to which any terminal may respond;
means for detecting whether no response, a single response, or multiple responses are received from the terminals in response to the general polling message, and for varying in dependence upon such detection at least one parameter which affects the bit error rate of the terminals, whereby in response to a general polling message a single response from one terminal is received;
means for transmitting an assigned address to said one terminal; and
means for repeating the general polling message until each of the terminals has been assigned an address.

9. A master station as claimed in claim 8 wherein said at least one parameter comprises the strength of signals transmitted from the master station, the means for varying comprising means for controlling said signal strength.

10. A terminal for use in a broadcast transmission system in which in normal operation messages and terminal addresses are transmitted between a master station and a plurality of such terminals each with an assigned address, the terminal comprising:
means responsive to a high bit error rate of its received signal for assuming a first state in which the terminal does not transmit;
means responsive to a reduced bit error rate of its received signal for assuming a second state in which the terminal transmits a response to a general polling message from the master station; and
means responsive to an address received from the master station while in the second state for adopting said address as its assigned address and assuming a third, normal operating state in which the terminal does not respond to said general polling message.

11. A terminal as claimed in claim 10 and including means for transmitting an acknowledgement of the address received from the master station.

* * * * *